US012686384B2

(12) United States Patent
Stein

(10) Patent No.:   US 12,686,384 B2
(45) Date of Patent:        Jul. 21, 2026

(54) VEHICLE AND METHOD FOR THE OPERATION THEREOF

(71) Applicant: DAIMLER TRUCK AG, Leinfelden-Echterdingen (DE)

(72) Inventor: Fridtjof Stein, Ostfildern (DE)

(73) Assignee: DAIMLER TRUCK AG, Leinfelden-Echterdingen (DE)

( * ) Notice: Subject to any disclaimer, the term of this patent is extended or adjusted under 35 U.S.C. 154(b) by 40 days.

(21) Appl. No.: 18/743,663

(22) Filed: Jun. 14, 2024

(65) Prior Publication Data

US 2024/0416904 A1      Dec. 19, 2024

(30) Foreign Application Priority Data

Jun. 16, 2023    (DE) ..................... 10 2023 115 825.2

(51) Int. Cl.
   *B60W 30/09*        (2012.01)
   *G06V 10/80*        (2022.01)
   *G06V 20/58*        (2022.01)
(52) U.S. Cl.
   CPC ............. *B60W 30/09* (2013.01); *G06V 10/80* (2022.01); *G06V 20/58* (2022.01); *B60W 2420/403* (2013.01); *B60W 2420/408* (2024.01); *B60W 2520/10* (2013.01); *B60W 2554/4041* (2020.02); *B60W 2554/4042* (2020.02); *B60W 2554/406* (2020.02); *B60W 2556/35* (2020.02); *B60W 2556/40* (2020.02); *B60W 2556/50* (2020.02); *B60W 2720/10* (2013.01)
(58) Field of Classification Search
   CPC ........... B60W 30/09; B60W 2420/403; B60W 2420/408; B60W 2520/10; B60W 2554/4041; B60W 2554/4042; B60W 2554/406; B60W 2556/35; B60W 2556/40; B60W 2556/50; B60W 2720/10; B60W 30/0956; G06V 10/80; G06V 20/58
   See application file for complete search history.

(56) References Cited

U.S. PATENT DOCUMENTS

| | | | |
|---|---|---|---|
| 12,291,236 B1 * | 5/2025 | Akman | ............. B60W 60/0015 |
| 12,371,054 B1 * | 7/2025 | Rawer | ................. B60W 60/001 |
| 2020/0225669 A1 * | 7/2020 | Silva | ........................ G01S 17/06 |

FOREIGN PATENT DOCUMENTS

DE        102019213951 A1      3/2021

* cited by examiner

*Primary Examiner* — Toya Pettiegrew
(74) *Attorney, Agent, or Firm* — PATENT PORTFOLIO BUILDERS PLLC

(57)                ABSTRACT

Surroundings in front of a vehicle are detected and the vehicle speed is reduced when the surroundings are partially shaded so the vehicle can be brought to a safe stop, without emergency braking, in front of an object located in the region of the shadowing in the lane in which the vehicle is travelling. In the event of a static detection of a reduced detection horizon less than a braking distance dependent on a current speed, the vehicle is decelerated such that the reduced detection horizon is again greater than the braking distance. Other road users in the surroundings of the vehicle are traced with sensors and shadowing by them and a resulting expected reduced detection horizon are determined in advance of a future point in time so that the vehicle speed is reduced and the expected reduced detection horizon at the time is again greater than the braking distance.

7 Claims, 6 Drawing Sheets

VEHICLE AND METHOD FOR THE OPERATION THEREOF

CROSS-REFERENCE TO RELATED APPLICATIONS

Figure 1:
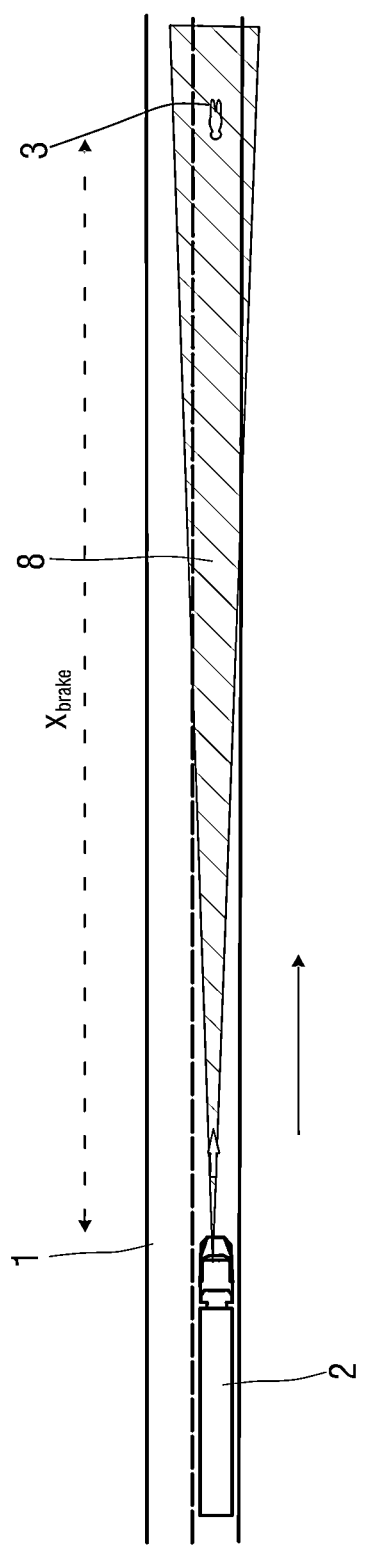

This application claims priority under 35 U.S.C. § 119 to German patent application 10 2023 115 825.2, filed on Jun. 16, 2023, the entire disclosure of which is herein expressly incorporated by reference.

BACKGROUND AND SUMMARY OF THE INVENTION

Exemplary embodiments of the invention relate to a method for operating a vehicle, as well as to a vehicle performing the method.

In the future, autonomous vehicles, for example HGVs and passenger cars, will increasingly be travelling on motorways and other roads.

Such vehicles locate themselves in the present infrastructure based on sensors (typically lidar, camera, radar) and map data and coordinate their driving behavior to other road users measured by the sensors.

These sensors installed for this purpose have measurement characteristics that are determined by the sensor type, the design, and physical constraints. Typically, the installed sensors have different objectives. For example, the lidar sensor measures a traffic-relevant region in front of the vehicle in three dimensions. Simultaneously, the camera data is used to determine the semantics of the scene being viewed and to recognize road signs and traffic lights.

The requirements derived from this determine sensor parameters, such as base width, focal length, aperture angle, pixel density, sensor type (color or monochrome), etc.

DE 10 2019 213 951 A1 describes a method for minimizing coverage of a field of vision of a sensor of a vehicle, wherein the coverage of the sensor can be minimized by means of an adaptation of the travel path of the vehicle.

Exemplary embodiments of the invention are directed to a novel method for operating a vehicle and a novel vehicle.

A method for operating a vehicle is disclosed, wherein surroundings in front of the vehicle are detected by means of at least one sensor, in particular a remote sensor, wherein a speed of the vehicle is reduced when the surroundings are partially shaded, so that the vehicle can be brought to a safe stop in front of an object located in the region of the shadowing in the lane in which the vehicle is travelling. According to the invention, it is provided that the speed of the vehicle is reduced so that the vehicle can be brought to a safe stop without emergency braking when an object is detected in the lane in which the vehicle is travelling, wherein, in the event of a static detection of a reduced detection horizon that is less than a braking distance dependent on a current speed, the vehicle is decelerated to such an extent that the reduced detection horizon is again greater than the braking distance, wherein other road users in the surroundings of the vehicle are traced with a plurality of sensors and shadowing by other road users and a reduced detection horizon expected as a result are determined in advance of a future point in time, wherein the speed of the vehicle is reduced so that the expected reduced detection horizon at the time is again greater than the braking distance.

Cameras, radar sensors or lidar sensors can be used as sensors, for example.

The solution according to the invention results in an increase in safety through constant monitoring of the traffic situation in conjunction with the road topology and the resulting possible prediction of the detection horizon of the sensor system.

The present invention can be used with a commercial vehicle for example. However, it is possible to also use it with a bus or a passenger car.

Exemplary embodiments of the invention are explained in more detail in the following using the drawings.

BRIEF DESCRIPTION OF THE DRAWING FIGURES

Figure 2:
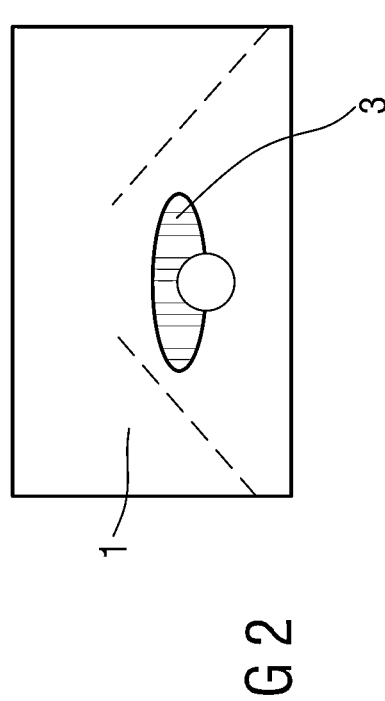
Figure 4:
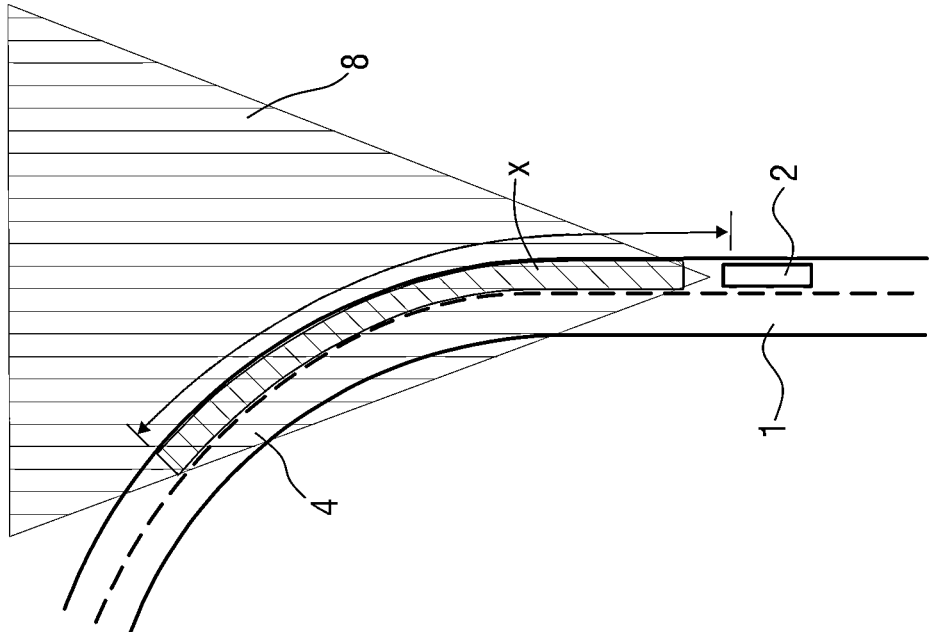
Figure 3:
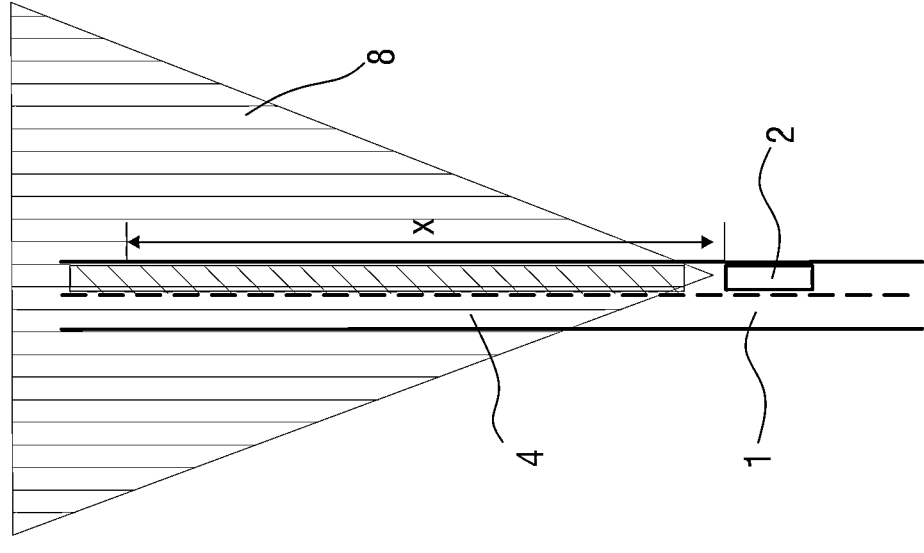
Figure 6:
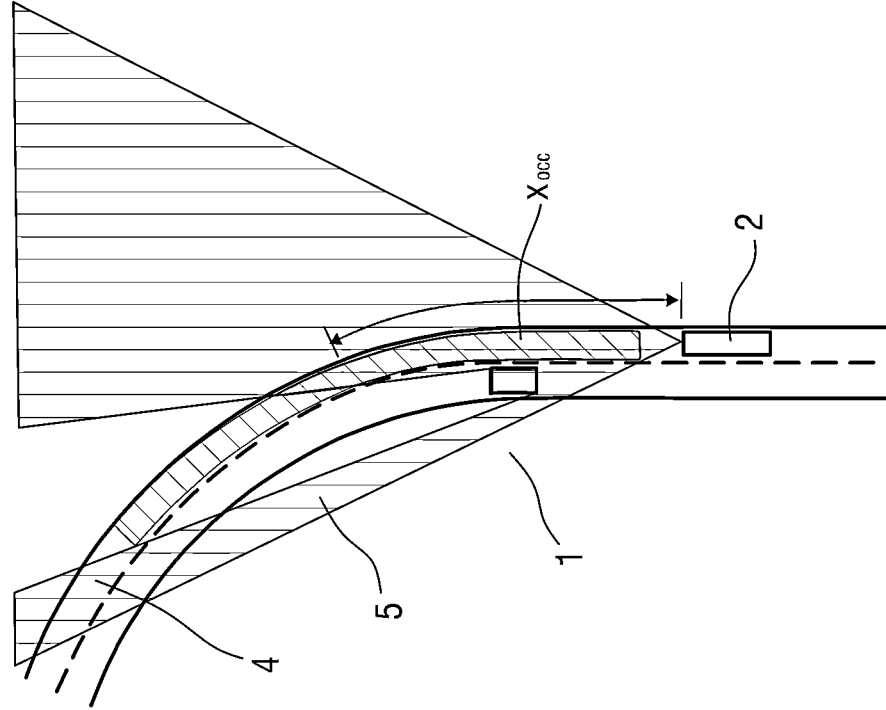
Figure 5:
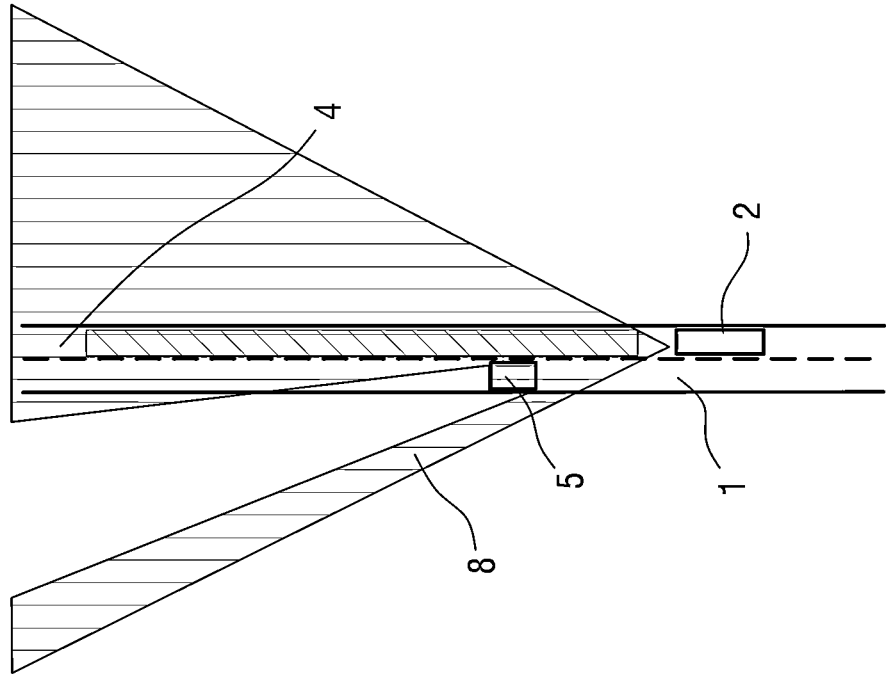
Figures 7, 8:
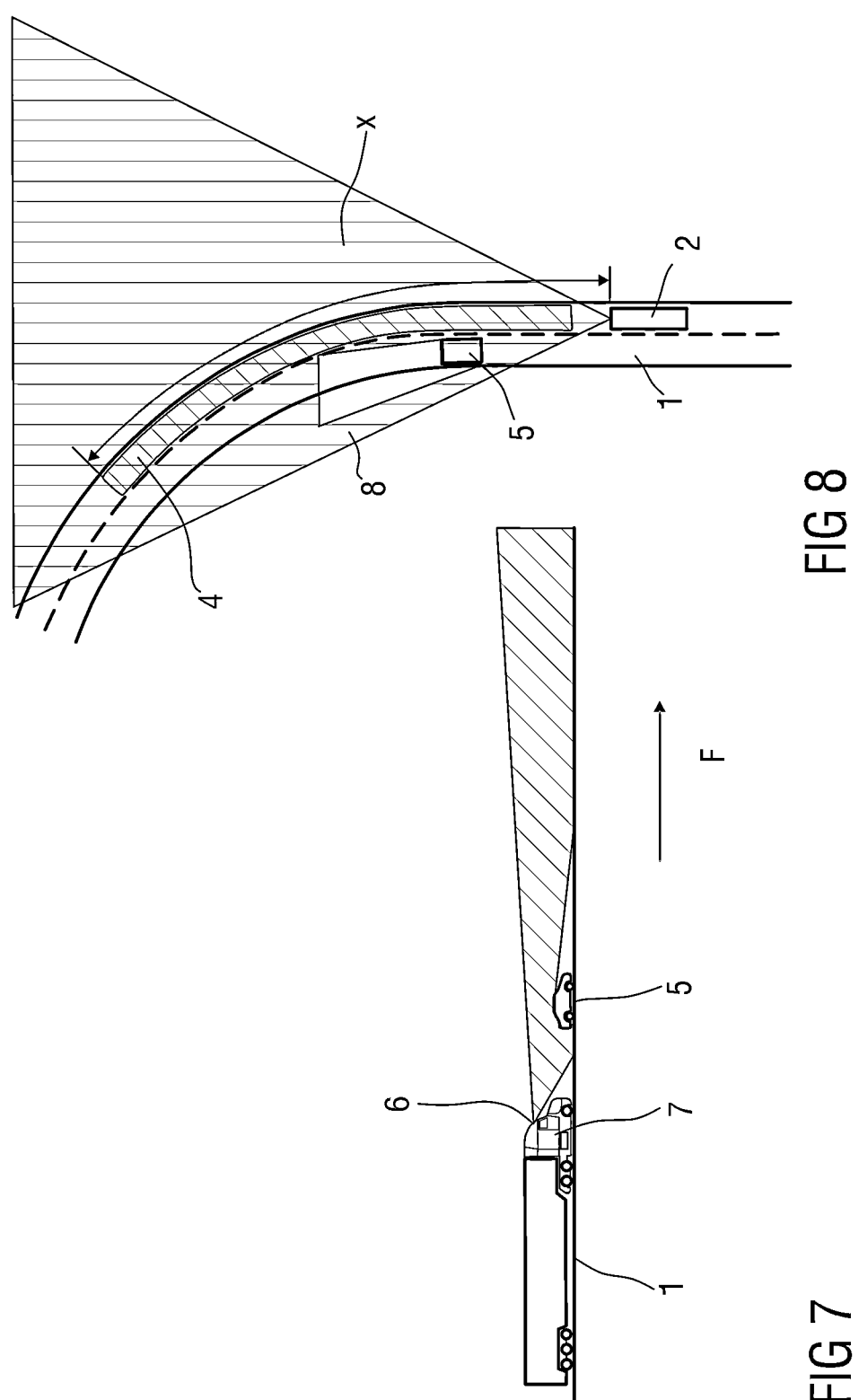
Figure 9:
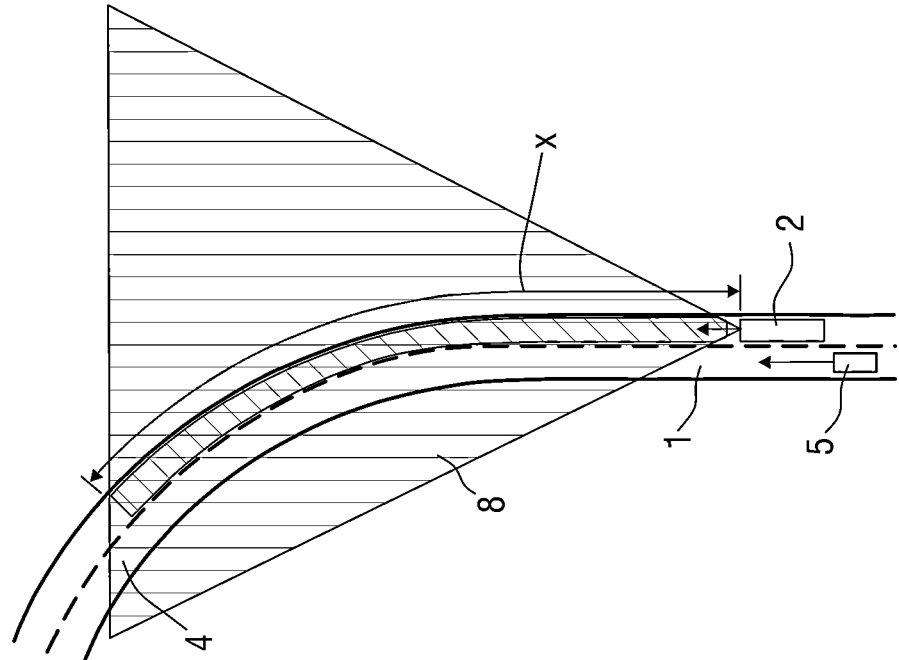
Figure 10:
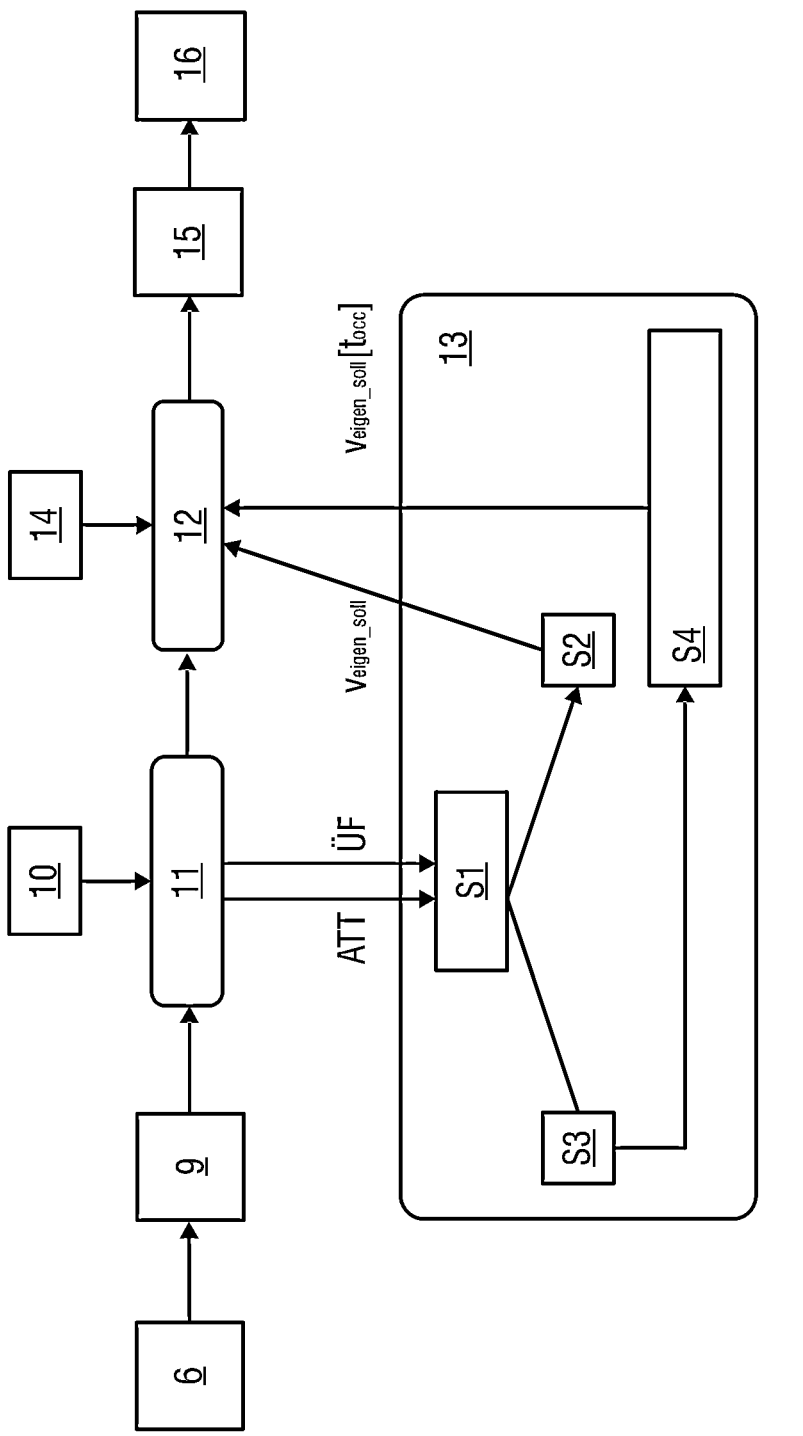

Here:

FIG. 1 shows a schematic view of a road with a vehicle, wherein an object is located on the road in a direction of travel in front of the vehicle, FIG. 2 shows a schematic view of the object from the view of a sensor of the vehicle, FIG. 3 shows a schematic view of a road with a vehicle, wherein the road and a lane of the vehicle are straight, FIG. 4 shows a schematic view of a road with a vehicle, wherein the road and a lane of the vehicle are curved, FIG. 5 shows a schematic view of a road with a vehicle with oncoming traffic, wherein the road and a lane of the vehicle are straight, FIG. 6 shows a schematic view of a road with a vehicle with oncoming traffic, wherein the road and a lane of the vehicle are curved, FIG. 7 shows a schematic view of a road with a vehicle having a sensor with a high installation position, wherein another road user is travelling in the same direction in front of the vehicle, FIG. 8 shows a schematic view of a road with a vehicle with a sensor with a high installation position with oncoming traffic, wherein the road and a lane of the vehicle are curved, FIG. 9 shows a schematic view of a road with a vehicle and a road user overtaking on the left, and FIG. 10 shows a schematic view of an exemplary processing chain for autonomous driving under consideration of the dynamic shadowing.

Parts corresponding to each other are provided with the same reference numerals in all the figures.

DETAILED DESCRIPTION

FIG. 1 is a schematic view of a road 1 with a vehicle 2, for example a commercial vehicle. An object 3 is located on the road 1 in the direction of travel F of the vehicle 2. The object 3 may be, for example, a lost load, rubbish, or an accident victim. In the present case, the object 3 is an accident victim, for example an unconscious, injured motorcyclist. The vehicle 2 has at least one sensor 6 (represented in FIG. 7) for detecting the surroundings in the direction of travel F. Cameras, radar sensors, or lidar sensors can be used as sensors 6, for example. FIG. 2 is a schematic view of the object 3 from the view of the sensor 6.

The vehicle 2 has a braking distance $x_{brake}$ available until it reaches the object 3, which can be determined with the following equation:

$$x_{brake} = v^2/(2 \cdot a) + v \cdot t$$

Here, v is the speed of the vehicle 2, a is the acceleration or deceleration of the vehicle 2, and t is the reaction time of the vehicle 2 or a driver. With a speed v of 106 km/h for example, a deceleration a of 4 m/s$^2$ and a reaction time t of one second for example results in a braking distance $x_{brake}$ of approximately 134 m.

FIG. 3 is a schematic view of a road 1 with a vehicle 2, wherein the road 1 and a lane 4 of the vehicle 2 are straight. Furthermore, a frustum 8 of the sensor 6 and a detection horizon x for objects 3 on the lane 4 is represented, which is greater than the braking distance $x_{brake}$, thus an emergency brake must not necessarily be carried out with maximal deceleration a when an object 3 is detected.

FIG. 4 is a schematic view of a road 1 with a vehicle 2, wherein the road 1 and a lane 4 of the vehicle 2 are curved. Furthermore, the frustum 8 of the sensor 6 and the detection horizon x is represented.

FIG. 5 is a schematic view of a road 1 with a vehicle 2, wherein the road 1 and a lane 4 of the vehicle 2 are straight. Another road user 5 is travelling in the opposite direction in an opposite lane. This causes a partial shadowing. The lane 4 being travelled in by the vehicle 2, however, remains completely visible for the sensor 6.

FIG. 6 is a schematic view of a road 1 with a vehicle 2, wherein the road 1 and a lane 4 of the vehicle 2 are curved. Another road user 5 is travelling in the opposite direction in an opposite lane. The lane 4 being travelled in by the vehicle 2 thus remains partially visible for the sensor 6, however it is partially obscured by the other road user 5. Therefore, a reduced detection horizon $x_{occ}$ results, which can be shorter than the braking distance $x_{brake}$. In another case, the other road user 5 may be an overtaking vehicle on its own multi-lane, unidirectional road, for example at a similar speed to the vehicle 2. In this case, the shadowing by the other road user 5 clearly lasts longer than in the case of oncoming traffic.

FIG. 7 is a schematic view of a road 1 with a vehicle 2, in particular a commercial vehicle having a sensor 6 with a high installation position, in particular above a cabin 7 of the vehicle 2. In front of the vehicle 2, another road user 5 with a comparatively low height, for example a passenger car, is travelling in the same direction at a relatively short distance. Due to the high installation position of the sensor 6, only a small part of the lane 4 being travelled in by the vehicle 2 in front of the other road user 5 is obscured by the latter, while the lane 4 remains visible in the direction of travel F up to the detection horizon X.

FIG. 8 is a schematic view of a road 1 with a vehicle 2, in particular a commercial vehicle having a sensor 6 with a high installation position, in particular above a cabin 7 of the vehicle 2, wherein the road 1 and a lane 4 of the vehicle 2 are curved. In the opposite lane, another road user 5 is travelling in the opposite direction at a relatively short distance and at a comparatively low height, for example a passenger car. Due to the high installation position of the sensor 6, only a small part of the opposite lane is obscured by it, while the individual lane 4 remains completely visible up to the detection horizon x.

According to the present invention, the driving mode of the vehicle 2 is adapted to dynamic changes in the detection horizon x, in particular the reduced detection horizon $x_{occ}$.

In particular, an intersection area A is observed, which corresponds to the intersection between the frustum 8 of the sensor 6 and a monitoring area ÜF.

In a static view, i.e., at a current point in time, no reaction is required to reduce the detection horizon x if the intersection area A is empty. On the other hand, if the intersection area A is not empty, immediate braking is required so that the reduced detection horizon $x_{occ}$ is again greater than the braking distance $x_{brake}$.

In a predictive view, all road users 5 are tracked all around with the present sensor system and the expected change in the detection horizon x, $x_{occ}$ can be determined in advance and appropriate measures, such as braking or accelerating, can be initiated as a precaution.

FIG. 9 is a schematic view of a road 1 with a vehicle 2, in particular a commercial vehicle, and a road user 5 overtaking on the left, for example a passenger car. This is detected by the sensors 6 of the vehicle 2. The change in the detection horizon x, $x_{occ}$ is calculated in advance on the basis of the speed of road user 5 and a road course derivable from a digital map 11 (shown in FIG. 10), and a reduction in the vehicle's own speed is dynamically planned and implemented without heavy braking intervention. If there is no longer any shadowing after the overtaking maneuver of the road user 5 and the latter continues to drive, a previous desired speed can be transmitted to a behavior planning module as the target speed again.

FIG. 10 is a schematic view of an exemplary processing chain for autonomous driving considering the dynamic shadowing. Several sensors 6, including at least one remote sensor, record data about the surroundings of the vehicle 2. The data from the sensors 6 are fused in a fusion module 9. Using the fused sensor data, road users 5 in the surroundings and their ATT attributes, in particular location, speed, and/or volume, are identified taking into account data from a satellite navigation system 10 and a digital map 11 and fed to a behavior planning module 12 and a dynamic shadowing module 13. The behavior planning module 12 also communicates with a backend 14, plans a behavior of the vehicle 2 and accordingly controls a longitudinal and lateral control 15, which controls an actuator 16 of the vehicle 2 in order to implement the planned behavior.

Furthermore, the dynamic shadowing module 13 is supplied with the monitoring area ÜF on the individual lane 4. In the dynamic shadowing module 13, the shadowing is calculated in step S1. If a shadowing is statically present, then in a step S2 the calculation of the vehicle's own speed $v_{eigen}$ is carried out, which is required so that the reduced detection horizon $x_{occ}$ is again greater than the braking distance $x_{brake}$. This is fed to the behavior planning module 12 as the target speed $v_{eigen\_soll}$ so that it can react as quickly as possible to the reduced detection horizon $x_{occ}$.

Furthermore, in a step S3, the dynamic shadowing module 13 predicts the shadowing based on the attributes ATT of detected road users 5 in the surroundings. If a shadowing is foreseeable at a point in time $t_{occ}$, then in a step S4 the calculation of the vehicle's own speed $v_{eigen}$ is carried out, which is required so that the reduced detection horizon $x_{occ}$ is again greater than the braking distance $x_{brake}$. This is fed to the behavior planning module 12 as the target speed $v_{eigen\_soll}(t_{occ})$ so that it can adapt the speed of the vehicle 2 to the expected reduced detection horizon $x_{occ}$ up to the time $t_{occ}$.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS 1 road
2 vehicle
3 object
4 lane
5 road user
6 sensor
7 cabin
8 frustum
9 fusion module
10 satellite navigation system
11 digital map
12 behavior planning module
13 dynamic shadowing module
14 back end
15 longitudinal and lateral control
16 actuator
ATT attribute
F direction of travel
ÜF monitoring area
S1 to S4 step
$t_{occ}$ time
$v_{eigen\_soll1}$ $v_{eigen\_soll}(t_{occ})$ target speed
x detection horizon
$x_{brake}$ braking distance
$x_{occ}$ reduced detection horizon

What is claimed is:

1. A vehicle, comprising:
at least one sensor configured to detect road users in surroundings in of the vehicle,
wherein the vehicle is configured to
determine that one of the road users is a static object within a detection horizon of the at least one sensor in front of the vehicle in a lane in which the vehicle is traveling;
determine a braking distance between the vehicle and the static object;
determine that the braking distance is less than the detection horizon of the at least one sensor;
reduce, responsive to determining the static object is within the detection horizon and that the braking distance is less than the detection horizon of the at least one sensor, a speed of the vehicle to a first reduced speed that brakes the vehicle within the determined braking distance without requiring emergency braking by the vehicle;
determine, at a subsequent time, that a current detection horizon of the at least one sensor is less than a current braking distance between the vehicle and the static object;
determine a second reduced speed that brings the vehicle to a standstill before reaching the static object and that causes the static object to be within an updated detection horizon, wherein the second reduced speed is lower than the first reduced speed; and reduce the speed of the vehicle to the second reduced speed so that the vehicle comes to the standstill before reaching the static object and the static object is within the updated detection horizon.

2. The vehicle of claim 1, wherein the at least one sensor is a camera, a radar sensor, or a lidar sensor.

3. The vehicle of claim 1, wherein the vehicle is a commercial vehicle.

4. The vehicle of claim 1, wherein the vehicle has a cabin, and
wherein the at least one sensor is arranged above the cabin.

5. A method for operating a vehicle, the method comprising:
detecting, by at least one sensor of the vehicle, road users in surroundings of the vehicle;
determining, by the vehicle, that one of the road users is a static object within a detection horizon of the at least one sensor in front of the vehicle in a lane in which the vehicle is traveling;
determining, by the vehicle, a braking distance between the vehicle and the static object;
determining, by the vehicle, that the braking distance is less than the detection horizon of the at least one sensor;
reducing, responsive to determining the static object is within the detection horizon and that the braking distance is less than the detection horizon of the at least one sensor, a speed of the vehicle to a first reduced speed that brakes the vehicle within the determined braking distance without requiring emergency braking by the vehicle;
determining, by the vehicle at a subsequent time, that a current detection horizon of the at least one sensor is less than a current braking distance between the vehicle and the static object;
determining, by the vehicle, a second reduced speed that brings the vehicle to a standstill before reaching the static object and that causes the static object to be within an updated detection horizon, wherein the second reduced speed is lower than the first reduced speed; and
reducing, by the vehicle, the speed of the vehicle to the second reduced speed so that the vehicle comes to the standstill before reaching the static object and the static object is within the updated detection horizon.

6. The method of claim 5, wherein the at least one sensor comprises a plurality of sensors detecting the road users in the surroundings of the vehicle, the method further comprising:
fusing data from the plurality of sensors to form fused data; and
determining attributes of the road users in the surroundings of the vehicle using the fused data and data from a satellite navigation system and a digital map,
wherein the determined attributes include location, speed, and volume of the road users in the surroundings of the vehicle, and
wherein the determination that the one of the road users is the static object is based on the determined attributes.

7. The vehicle of claim 4, wherein the vehicle is a commercial vehicle and the at least one sensor is arranged above a cabin of at least one of the road users in the surroundings of the vehicle.

* * * * *